US011454111B2

(12) United States Patent
Wei et al.

(10) Patent No.: US 11,454,111 B2
(45) Date of Patent: Sep. 27, 2022

(54) DETERMINATION OF REPRESENTATIVE ELEMENTAL LENGTH BASED ON SUBSURFACE FORMATION DATA

(71) Applicant: Landmark Graphics Corporation, Houston, TX (US)

(72) Inventors: Wan Wei, Austin, TX (US); Travis St. George Ramsay, Hockley, TX (US); Naveen Krishnaraj, Houston, TX (US); Vitor Ribeiro Silos, Rio de Janeiro (BR); Milena Ferreira Siqueira, Rio de Janeiro (BR)

(73) Assignee: Landmark Graphics Corporation, Houston, TX (US)

( * ) Notice: Subject to any disclaimer, the term of this patent is extended or adjusted under 35 U.S.C. 154(b) by 368 days.

(21) Appl. No.: 16/867,264

(22) Filed: May 5, 2020

(65) Prior Publication Data
US 2021/0238997 A1 Aug. 5, 2021

Related U.S. Application Data

(60) Provisional application No. 62/968,131, filed on Jan. 30, 2020.

(51) Int. Cl.
*E21B 47/26* (2012.01)
*E21B 47/002* (2012.01)
(Continued)

(52) U.S. Cl.
CPC ............ *E21B 47/26* (2020.05); *E21B 47/008* (2020.05); *E21B 47/0025* (2020.05); *G01V 99/005* (2013.01)

(58) Field of Classification Search
None
See application file for complete search history.

(56) References Cited

U.S. PATENT DOCUMENTS 8,909,508 B2 * 12/2014 Hurley .................... G06T 7/136
703/10
2009/0254281 A1 10/2009 Hruska et al.
(Continued)

FOREIGN PATENT DOCUMENTS

CA 2868872 10/2013
CN 107680131 2/2018
(Continued)

OTHER PUBLICATIONS

International Search Report and Written Opinion for Application PCT/US2020/032501, dated Oct. 20, 2020.
Ringrose, P., & Bentley, M. (2015). Reservoir Model Design.

*Primary Examiner* — Lina M Cordero
(74) *Attorney, Agent, or Firm* — Tenley Krueger; C. Tumey Law Group PLLC

(57) ABSTRACT

A method and system for forming Representative Elemental Length (REL) of well data. The method may comprise inputting log data from a borehole in a formation into an information handling system, identifying an initial length of the REL section and divide the log data into a plurality of REL investigation sections that are of substantially equal length, calculating an average value of a formation property for each of the plurality of REL investigation sections, and selecting a maximum value and a minimum value of the REL investigation sections. The method may further comprise checking the maximum value and the minimum value are stable, deriving the formation property for each of the REL sections as an output, and forming a model of the formation from each of the REL sections. The system may comprise a downhole device, configured to take measurements of a formation, and an information handling system.

20 Claims, 4 Drawing Sheets

(51) Int. Cl.
*E21B 47/008* (2012.01)
*G01V 99/00* (2009.01)

(56) References Cited

U.S. PATENT DOCUMENTS

| | | |
|---|---|---|
| 2009/0276157 A1 | 11/2009 | Wilkinson et al. |
| 2012/0277996 A1* | 11/2012 | Hurley ................. G01V 99/005 382/109 |
| 2014/0229891 A1 | 8/2014 | O'Byrne et al. |
| 2016/0148130 A1 | 5/2016 | Krishnan et al. |
| 2016/0161635 A1 | 6/2016 | Ramsay et al. |
| 2016/0178800 A1 | 6/2016 | Ramsay |
| 2016/0202390 A1 | 7/2016 | Ramsay et al. |
| 2016/0209546 A1 | 7/2016 | Ramsay et al. |
| 2016/0231462 A1 | 8/2016 | Ramsay |
| 2016/0245950 A1 | 8/2016 | Ramsay |
| 2018/0016876 A1 | 1/2018 | Lynch et al. |
| 2018/0320493 A1 | 11/2018 | Ramsay et al. |
| 2019/0026405 A1 | 1/2019 | Ramsay et al. |
| 2019/0041536 A1 | 2/2019 | Ramsay et al. |
| 2019/0078435 A1 | 3/2019 | Song et al. |
| 2019/0195061 A1 | 6/2019 | Ramsay et al. |
| 2019/0383133 A1 | 12/2019 | Pollack et al. |
| 2020/0005013 A1* | 1/2020 | Zhao .................... G06V 20/695 |

FOREIGN PATENT DOCUMENTS

| | | |
|---|---|---|
| WO | 2012118867 | 9/2012 |
| WO | 2018-164680 | 9/2018 |

* cited by examiner

DETERMINATION OF REPRESENTATIVE ELEMENTAL LENGTH BASED ON SUBSURFACE FORMATION DATA

BACKGROUND

Boreholes drilled into subterranean formations may enable recovery of desirable fluids (e.g., hydrocarbons) using a number of different techniques. A downhole tool may be employed in subterranean operations to determine borehole and/or formation properties. During these operations, measurements from the downhole tool may be one or two-dimensional in nature. One or two-dimensional data may be utilized for determining a three-dimensional grid resolution, used for predicting formation fluid production at scale. The three-dimensional grid resolution and/or domain characterization of rock-fluid interaction should replicate multiphase fluid flow behavior in the identified formation rock types.

Producing a three-dimensional grid resolution and/or domain characterization of rock-fluid interaction from one-dimensional measurements will improve multiphase flow characterization in simulation models that are used to predict subsurface reservoir performance.

BRIEF DESCRIPTION OF THE DRAWINGS

These drawings illustrate certain aspects of some examples of the present disclosure and should not be used to limit or define the disclosure.

DETAILED DESCRIPTION

The present disclosure relates generally to a system and method for utilizing a one-dimensional (1D) description of formation data where, currently, two-dimensional (2D) data and three dimensional (3D) data are used as input. As disclosed below, methods and systems address the inconsistencies that exist in the assignment of rock-fluid interaction (KR, PC) to a geo-cellular grid or gridless flow simulation domain. Inconsistencies are due to prior grid/domain development occurred arbitrarily and is focused on maintaining the finest degree of resolution or ensuring computational performance.

Figure 1:
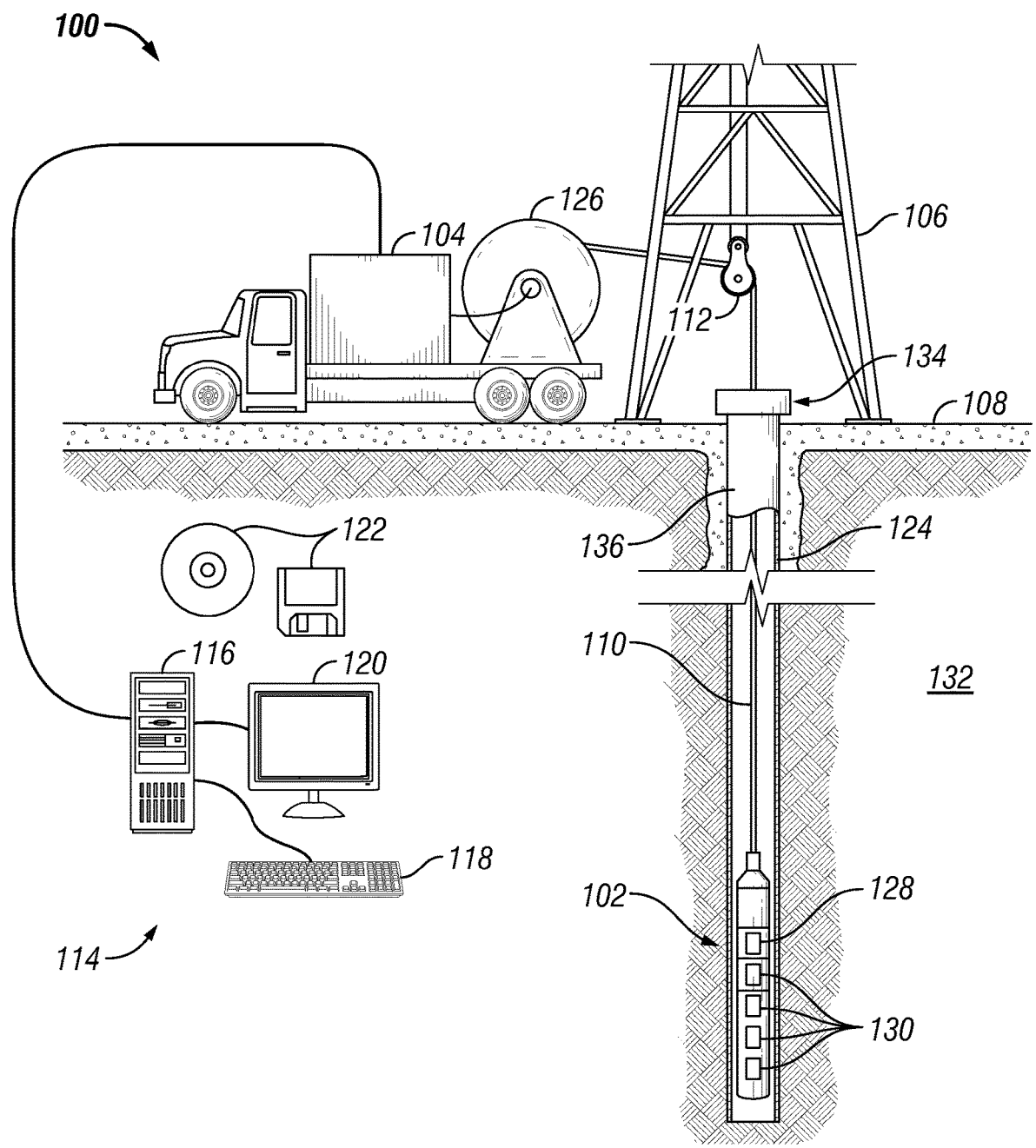
FIG. 1 illustrate an example of a well measurement system.

FIG. 1 illustrates a cross-sectional view of a well measurement system 100. As illustrated, well measurement system 100 may include downhole tool 102 attached to a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, drill string, downhole tractor, or the like. In some examples, conveyance 110 may provide mechanical suspension, as well as electrical connectivity, for downhole tool 102.

Conveyance 110 may include, in some instances, a plurality of electrical conductors extending from vehicle 104. Conveyance 110 may include an inner core of seven electrical conductors covered by an insulating wrap. An inner and outer steel armor sheath may be wrapped in a helix in opposite directions around the conductors. The electrical conductors may be used for communicating power and telemetry between vehicle 104 and downhole tool 102.

Conveyance 110 may lower downhole tool 102 in borehole 124. Generally, borehole 124 may include horizontal, vertical, slanted, curved, and other types of borehole geometries and orientations. Imaging tools may be used in uncased sections of the borehole. Measurements may be made by downhole tool 102 in cased sections for purposes such as calibration.

As illustrated, borehole 124 may extend through formation 132. As illustrated in FIG. 1, borehole 124 may extend generally vertically into the formation 132, however borehole 124 may extend at an angle through formation 132, such as horizontal and slanted boreholes. For example, although FIG. 1 illustrates a vertical or low inclination angle well, high inclination angle or horizontal placement of the well and equipment may be possible. It should further be noted that while FIG. 1 generally depicts a land-based operation, those skilled in the art may recognize that the principles described herein are equally applicable to subsea operations that employ floating or sea-based platforms and rigs, without departing from the scope of the disclosure.

Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some examples, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. While shown at surface 108, information handling system 114 may also be located at another location, such as remote from borehole 124. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

As discussed below, methods may utilize an information handling system 114 to determine and display a high resolution resistivity image of formation 132 immediately surrounding borehole 124. This high resolution resistivity image may depict boundaries of subsurface structures, such as a plurality of layers disposed in formation 132. These formation images may be used in reservoir characterization. Formation images and/or wireline logs with high resolution may allow accurate identification of thin beds and other fine features such as fractures, clasts and vugs. These formation wireline logs may provide information about the sedimentology, lithology, porosity and permeability of formation 132. The formation images may complement, or in some cases replace, the process of coring.

In examples, rig 106 includes a load cell (not shown) which may determine the amount of pull on conveyance 110 at the surface of borehole 124. Information handling system 114 may include a safety valve which controls the hydraulic pressure that drives drum 126 on vehicle 104 which may reel up and/or release conveyance 110 which may move downhole tool 102 up and/or down borehole 124. Conveyance 110 may provide a means of disposing downhole tool 102 into borehole 124. The safety valve may be adjusted to a pressure such that drum 126 may only impart a small amount of tension to conveyance 110 over and above the tension necessary to retrieve conveyance 110 and/or downhole tool 102 from borehole 124. The safety valve is typically set a few hundred pounds above the amount of desired safe pull on conveyance 110 such that once that limit is exceeded; further pull on conveyance 110 may be prevented.

Figure 2:
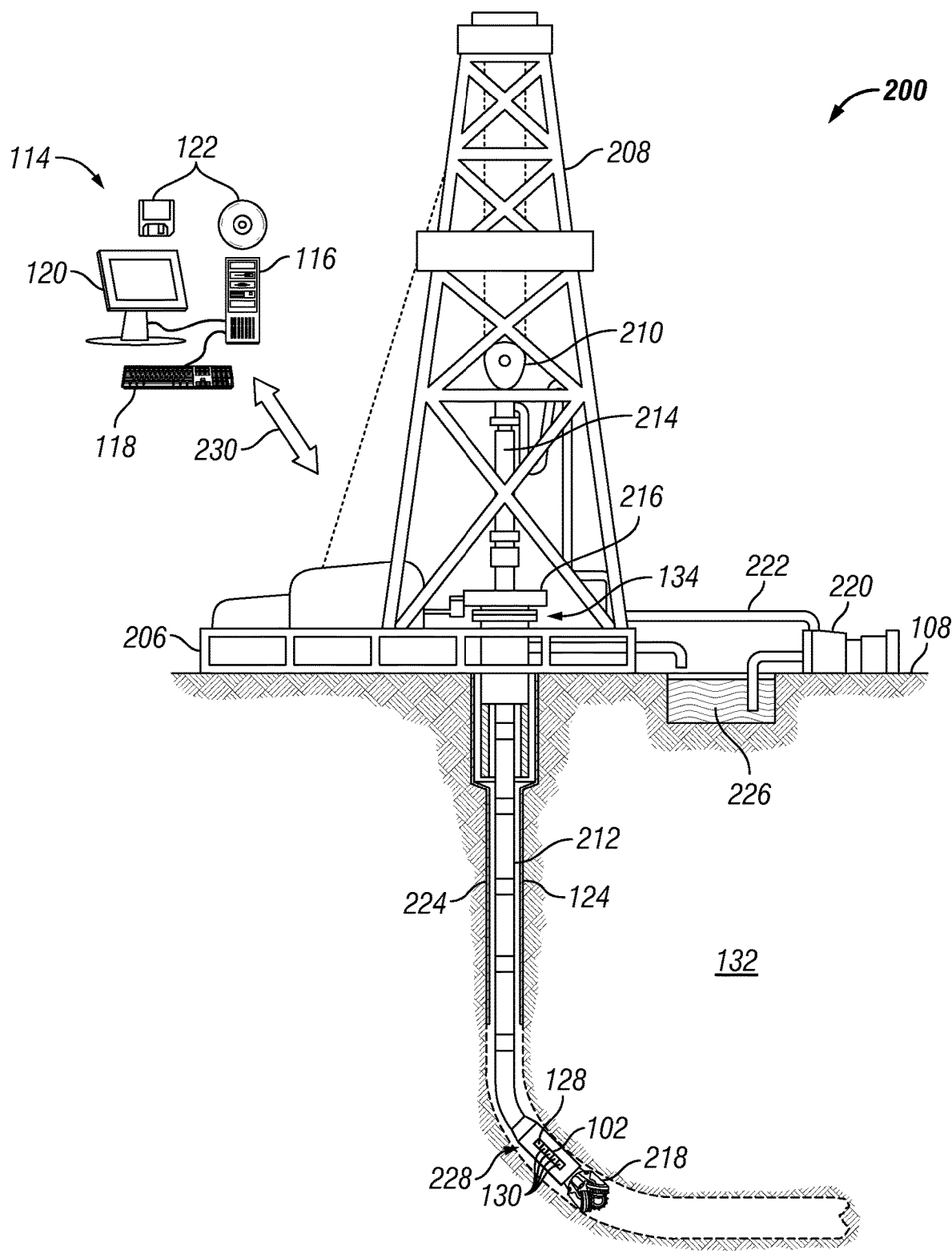
FIG. 2 illustrates another example of a well measurement system.

FIG. 2 illustrates an example in which downhole tool 102 (Referring to FIG. 1) may be disposed in a drilling system 200. As illustrated, borehole 124 may extend from a wellhead 134 into formation 132 from surface 108. As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 108. In examples, drill bit 218 may include, roller cone bits, PDC bits, natural diamond bits, any hole openers, reamers, coring bits, and the like. As drill bit 218 rotates, it may create and extend borehole 124 that penetrates various formations 132. A pump 220 may circulate drilling fluid through a feed pipe 222 to kelly 214, downhole through interior of drill string 212, through orifices in drill bit 218, back to surface 108 via annulus 224 surrounding drill string 212, and into a retention pit 226.

With continued reference to FIG. 2, drill string 212 may begin at wellhead 134 and may traverse borehole 124. Drill bit 218 may be attached to a distal end of drill string 212 and may be driven, for example, either by a downhole motor and/or via rotation of drill string 212 from surface 108 (Referring to FIG. 1). Drill bit 218 may be a part of bottom hole assembly 228 at distal end of drill string 212. Bottom hole assembly 228 may further include downhole tool 102 (Referring to FIG. 1). Downhole tool 102 may be disposed on the outside and/or within bottom hole assembly 228. As will be appreciated by those of ordinary skill in the art, bottom hole assembly 228 may be a measurement-while drilling (MWD) or logging-while-drilling (LWD) system.

In examples, bottom hole assembly 228 may be connected to and/or controlled by information handling system 114 (Referring to FIG. 1), which may be disposed on surface 108. In examples, information handling system 114 may be disposed down hole in bottom hole assembly 228. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 228 may be brought to surface 108. In examples, information handling system 114 may communicate with bottom hole assembly 228 through a fiber optic cable (not illustrated) disposed in (or on) drill string 212. In examples, wireless communication may be used to transmit information back and forth between information handling system 114 and bottom hole assembly 228. Information handling system 114 may transmit information to bottom hole assembly 228 and may receive as well as process information recorded by bottom hole assembly 228. In examples, a downhole information handling system (not illustrated) may include, in examples, a microprocessor or other suitable circuitry, for estimating, receiving and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 108. Alternatively, raw measurements from bottom hole assembly 228 may be transmitted to surface 108.

Any suitable technique may be used for transmitting signals from bottom hole assembly 228 to surface 108, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 108. In examples, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 230, which may be a wired or wireless link. The telemetry data may be analyzed and processed by information handling system 114.

As illustrated, communication link 230 (which may be wired or wireless, for example) may transmit data from bottom hole assembly 228 to an information handling system 114 at surface 108. Information handling system 114 may include a processing unit 116 (Referring to FIG. 1), a video display 120 (Referring to FIG. 1), an input device 118 (e.g., keyboard, mouse, etc.) (Referring to FIG. 1), and/or non-transitory computer-readable media 122 (e.g., optical disks, magnetic disks) (Referring to FIG. 1) that may store code representative of the methods described herein. In addition to, or in place of processing at surface 108, processing may occur downhole.

Information handling system 114 (e.g., referring to FIGS. 1 and 2) may further take measurements taken by downhole tool 102 during logging operations through a plurality of electrodes, such as button array 128 (e.g., referring to FIGS. 1 and 2) and return electrodes 130 (e.g., referring to FIGS. 1 and 2) to produce a well log. In examples, the well log may be based on depth and properties of formation 132 (e.g., referring to FIGS. 1 and 2). The well log may include a continuous measurement of formation properties with depth resolutions, which may also be identified as well log data. In a well log, well log data may exhibit variation along designated measured sections, i.e., a chosen depth or set of depths to be investigated, due to heterogeneous nature of rocks within formation 132. Variations are attributed to formation 132 being comprised of different types of rock and that rock being saturated with varying amounts of water, oil, and gas depending on the depth of the formation being examined. The depth dependence of fluid content is a function of fluid density. Additionally, formations 132 may include faults and other petrophysical baffles that vary azimuthally.

A Representative Elemental Length (REL) is the smallest length over which a specific property of formation 132 may be measured and determined to be representative of the length identified as the designated measured section. From the well log data, methods described how each REL section is identified from the well log based on well log data. Each REL section may then be used to define the resolution of geocellular grids in earth model building or characterization of the spatial domain in a gridless flow simulation model. A geocellular grid is a digital structure that is designed to follow the stratigraphic description of formation 132 (e.g., referring to FIG. 1) for the purpose of modeling the surface so that production of oil and gas may be predicted. The structure is represented by a series of gridblocks that are described by disparate configurations (connected and non-connected in three-dimensional space with structured or unstructured ordering). The gridblocks define connected and non-connected subsurface volumes and allow flow simulation to be computed between gridblocks. Gridless simulations, however, are defined by the spatial characterization of specific domains for the type of flow and storage related attributes that are anticipated to occur in the domain. The solution from the methods described below are used to determine a criterion to select a REL based on petrophysical properties provided by the well log data. As discussed below, FIGS. 3 and 4 disclose how REL investigation sections are determine and FIGS. 5 and 6 disclose a second method for determining the REL investigation sections based of a fixed point.

Figure 3:
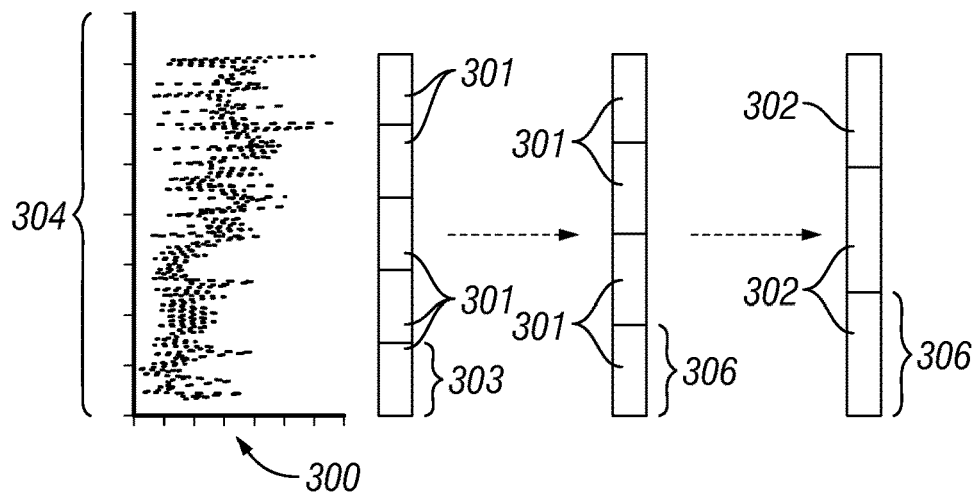
FIG. 3 illustrates an example of a well log that is segmented into Representative Element Lengths.

FIG. 3 illustrates how REL investigation section 301 are identified from a well log 300. In examples, a well log 300 may be broken into one or more REL investigation sections 301 along length 304 of well log 300. Initial length 303 of each REL investigation section 301 is defined as the resolution of the data being analyzed. The resolution is based at least in part on the sampling rate of downhole device 102 (e.g., referring to FIG. 1). Thus, initial length 303 of each REL investigation section 301 is the sampling rate of the specific downhole device 102 in logging operations. For example, if downhole device 102 has a resolution of about two feet (about one meter), then initial length 303 of each REL investigation section 301 is about two feet (about one meter). In examples, the initial length may be substantially equal in length. Thus, the initial length of each REL investigation section 301 may be at least ninety nine percent (99%) the same. During investigation of formation property, initial length 303 is further refined based at least in part on formation properties. Formation properties may include porosity, permeability, gamma ray, resistivity, density, facies, lithology, and/or the like. A selected formation property of formation 132 (e.g., referring to FIGS. 1 and 2) is averaged for each REL investigation section 301. For examples, formation properties that may be chosen may be porosity and/or permeability. The properties are averaged by summing sampled properties along the wireline or image log, having a minimum vertical resolution of about two feet (about one meter), and dividing the properties by the number of samples being examined.

The averaging increases or decreases the length of REL investigation section 301 to for segment length 306. As illustrated in FIG. 3, as the number of REL investigation sections 301 decreases, segment length 306 increases. After investigation, which may increase or decrease segment length 306 of REL investigation section 301, the variations of maximum value and minimum value for a formation property may be plotted within segment length 306 to determine a REL section 302. For example, the maximum value and the minimum value may each form one end of segment length 306.

Figure 4:
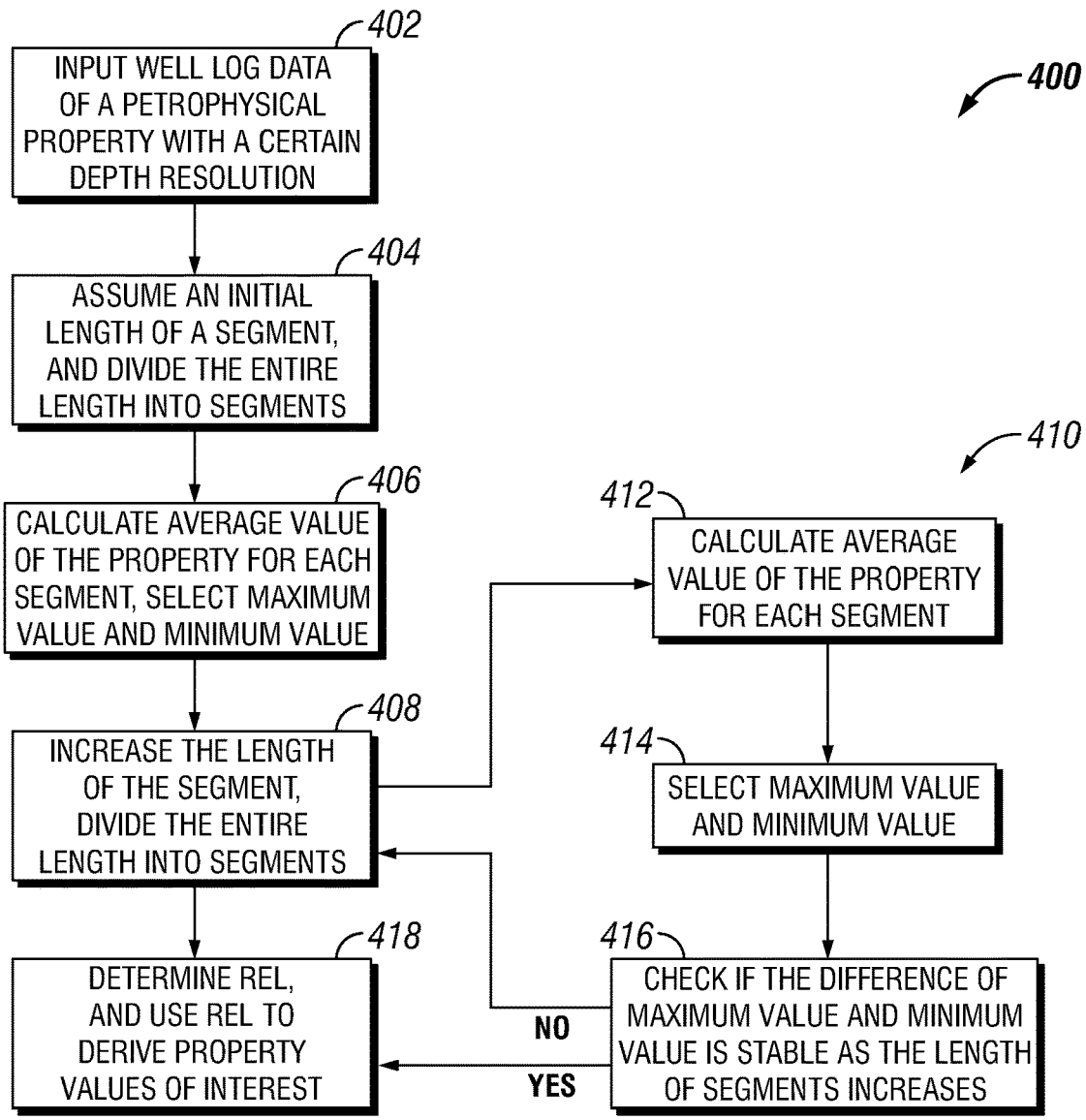
FIG. 4 illustrates a workflow for segmentation of the well log.

FIG. 4 is a workflow 400 illustrating the method for determining a REL section 302 (e.g., referring to FIG. 3) based on well log data from well log 300 (e.g., referring to FIG. 3). Workflow 400 may begin with block 402. In block 402 well log data of a formation property, with a chosen depth resolution for the length of borehole 124 (e.g., referring to FIG. 1), from well log 300 is input into information handling system 114 (e.g., referring to FIGS. 1 and 2) as 1D data. The well log data is only 1D data because it contains only two variables, those being a formation property at a given point, which would form a x value and a y value on a 1D graph. This input is utilized for block 402, which processes the measured 1D data. Formation properties that are measured may be porosity, permeability, gamma ray, resistivity, density, and/or the like. As described above, depth resolution, also initial length 303 of REL investigation sections 301 (e.g., referring to FIG. 3), is based on the specific downhole device 102 (e.g., referring to FIG. 1) used in logging operations. The log may have a resolution of two inches to four inches (50 mm to 100 mm) or two feet to seven feet (1 meter to 2 meters). The output from block 402 is an input for block 404.

In block 404 an initial length 303 of REL investigation section 301 (e.g., referring to FIG. 3) is chosen based on the resolution of the downhole device 102 and length 304 of well log 300 is divided into REL investigation sections 301. After REL investigation sections 301 are identified, in block 406 the average value of a formation property for each REL investigation section 301 is calculated by averaging formation property value over the range of investigated length in a particular REL investigation section 301 and selecting a maximum value and a minimum value are identified within REL investigation section 301. For example, as a first iteration the investigated length occurs at the scale of the original resolution, such as about two feet (about one meter), of the wireline or image log. This provides a baseline measurement that is not anticipated to lead to the determination of a REL section 302, since it is based on the resolution of downhole device 102 used to acquire the data. The standard deviation, maximum and minimum observed value from the sampled data is recorded. As a next iteration, an investigation length of about four feet (about two meters), which is two samples that are about two feet (about one meter) is created and shifted across the log—sampling two recorded properties at a time. As the investigation length is shifted the properties from the two samples are averaged. These averaged values are then compared against each other to determine how each value vary with respect of each other. The new standard deviation, maximum and minimum value of the sampled data is recorded. In subsequent steps the investigation length is increased according to a function of the $i^{th}$ iteration times the original resolution. The iterations are continued until the standard deviation, maximum and minimum values stabilize. Stability may be determined according to a user defined tolerance. For example, stability may be an error percentage of less than ten percent. Thus, from the calculation in block 406, initial length 303 of REL investigation section 301 may be increased, with length 304 of well log 300 being evenly augmented again. Within block 408 a check loop 410 is performed to determine if the length of REL investigation section 301 is accurate.

Within check loop 410, block 412 calculate an average value of the formation property for each REL investigation section 301. To calculate an average value, all measured data is collected in REL investigation section 301 and divided by the amount of observed data that was investigated in REL investigation section 301. In block 414 a maximum value and minimum value are selected, as discussed above, from the information in block 412. In block 416 the difference of a maximum value and minimum value are checked to determine if the maximum value and minimum value are stable as the length of REL investigation section 301 increases. Checking the maximum and minimum values occur after one iteration of computing an average as well as determining a maximum and minimum of REL investigation section 301. As a result, the check begins once REL investigation section 301 is enlarged at least once. Stability is determined by minimizing the difference between the calculated average as well as the determined maximum and minimum value obtained from the prior and current REL investigation sections 301 that may have been investigated. As discussed above, stability is defined by personnel, such as an error of less than ten percent, which would be a tolerance for the change in standard deviation, maximum and minimum values being sampled across individual investigation lengths.

If the maximum value and the minimum value are not stable then the process goes back to block 408, variables are updated, and check loop 410 is performed again. Variables in this instance are an investigation length that is increased in the re-scanning of the log samples and is re-initiated at the increased length. To update a variable, REL investigation section 301 is enlarged, for example, automatically or user defined extension of length is implemented that may be small or large in magnitude. As an alternative, a user may also soften the stability criteria. If the maximum value and the minimum value are stable, then workflow 400 ends with block 418 in which each REL investigation section 301 is determined and forms a REL section 302. Each REL section 302 is used to derive the applicable rock type resolution or domain description based on identified formation values. For the derivation of an REL section 302, determining the average, standard deviation, maximum and minimum values over a range of an identified rock type in formation 132 (e.g., referring to FIG. 1) to have consistent values over a range of the REL sections 302 may increase the length of REL investigation sections 301 in each iteration. After a convergence is found from the averaging, standard deviation, the identified maximum and minimum denote a REL section 302. In examples, convergence may be found by comparing the average, standard deviation, maximum and minimum value from a given iteration against the prior iteration. When there is insignificant variation of the average, standard deviation, and/or maximum and minimum according to personnel defined tolerances, defined above, convergence is established.

Figure 5:
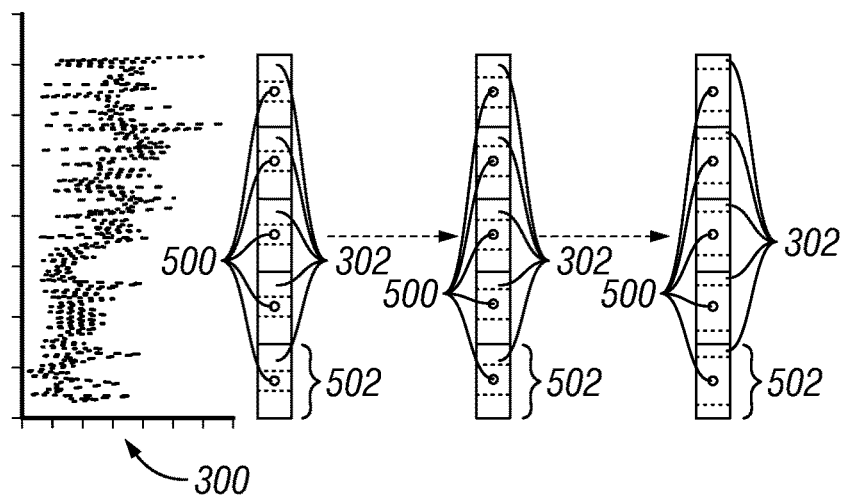
FIG. 5 illustrates another example of the well log that is segmented into fixed points.
Figure 6:
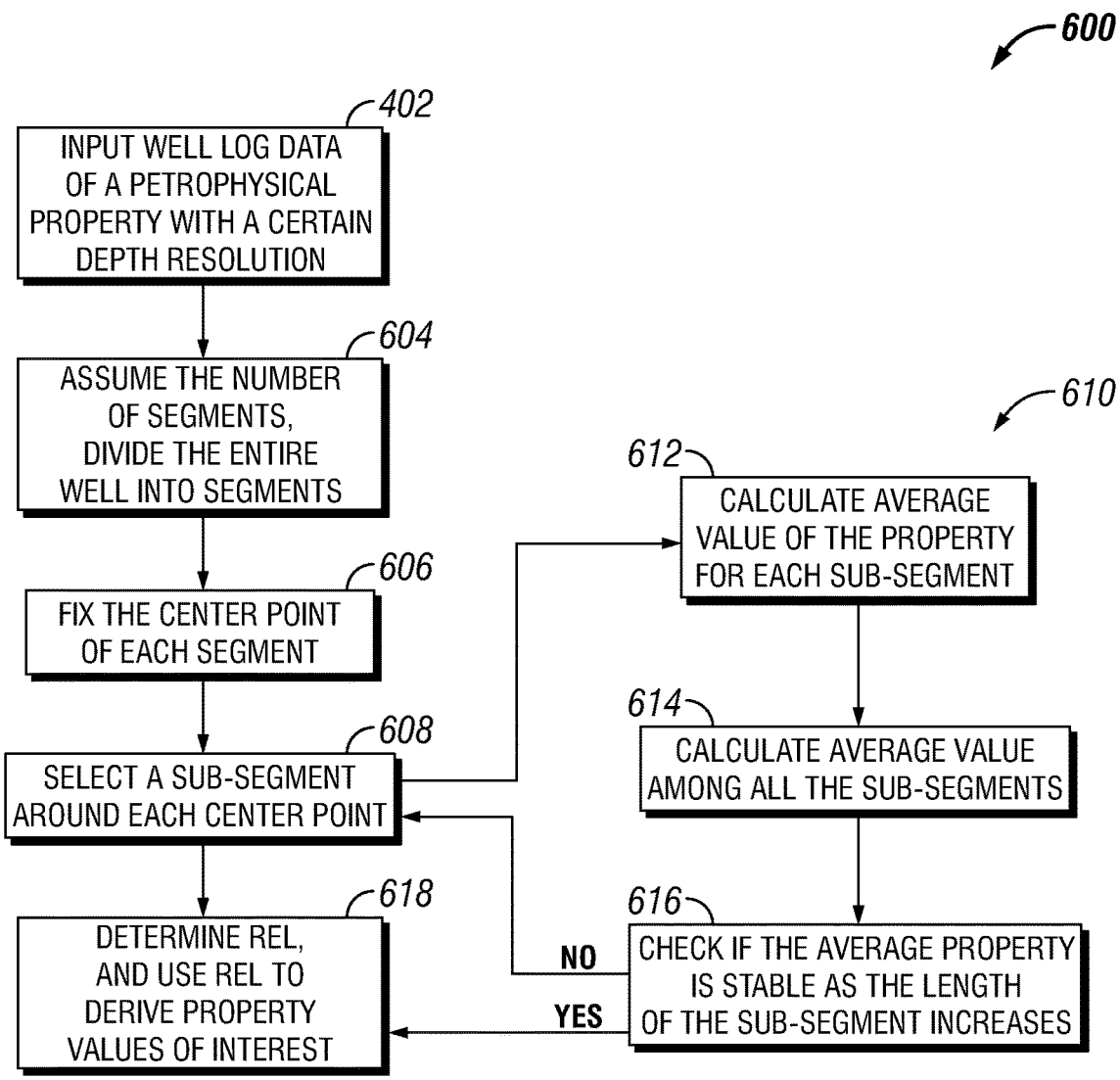
FIG. 6 illustrates a workflow for determining one or more fixed points from the well log.

Both FIGS. 3 and 4 illustrate the method for determining the length of an REL section 302. FIGS. 5 and 6 disclose determining a fixed point within each REL section 302. A "fixed point" refers to a method whereby the initial length of investigation is based on a particular set of features that have been identified in a well log. Once the original fixed points have been identified the method for determining a length of REL section 302 is performed, starting with an investigation length that is equal to that of the original log, and centered by the determined fixed point.

FIG. 5 illustrates a method for determining a fixed point within each REL section 302. Using a fixed point 500 in this method may allow for a length of sub-segment length 502 to increase during each REL investigation about a fixed point. In this method each REL section 302 is constant. Fixed points 500 of each REL segment 302 are fixed and a sub-segment length 502 is selected around fixed point 500. The average formation property is calculated, as discussed above in check loop 410, for all sub-segment lengths 502. The variation of the average formation property is plotted against the sub-segment length 502 to determine a REL section 302. This method performs representative length determination over volume based methods, wherein volume based methods consider two additional dimensions. Thus, grid resolution may be computed quickly but also using data other than that derived from wireline logs.

FIG. 6 is a workflow 600 on the method for determining a REL section 302 (e.g., referring to FIG. 3) based on well log data from well log 300 (e.g., referring to FIG. 3). Workflow 600 may begin with block 602. In block 602 well log data from well log 300 of a formation property, with a chosen depth resolution for the length of borehole 124 (e.g., referring to FIG. 1), from well log 300 is input into information handling system 114 (e.g., referring to FIGS. 1 and 2) as 1D data. The well log data is only 1D data because it contains only two variables, those being a formation property at a given point, which would form a x value and a y value on a 1D graph. This input is utilized for block 602, which processes the measured 1D data. Formation properties that are measured may be porosity, permeability, gamma ray, resistivity, density, and/or the like. As described above, depth resolution, also initial length 303 of REL sections 302 (e.g., referring to FIG. 3), is based on the specific downhole device 102 (e.g., referring to FIG. 1) used in logging operations. The log may have a resolution of two inches to four inches (50 mm to 100 mm) or two feet to seven feet (1 meter to 2 meters). The output from block 602 is an input for block 604.

In block 604 initial length 303 of a REL section 302 (e.g., referring to FIG. 3) is chosen based on the resolution of downhole device 102 and length 304 of well log 300 is divided into REL sections 302. After REL sections 302 are found, in block 606 fixed points 500 (e.g., referring to FIG. 5) of each REL section 302 are fixed. For example, a specific formation property in the data being investigated in REL section 302 is treated as a fixed point 500. The average, standard deviation, maximum and minimum are computed, as discussed above, in REL section 302. REL section 302 is further enlarged keeping fixed point 500 as the center of REL section 302. The comparison across iterations of REL sections 302 are then performed to determine REL section 302. From the calculation in block 606, a sub-segment length 502 (e.g., referring to FIG. 5) is determined around each fixed point 500 in block 608. Within block 608 a check loop 610 is performed to determine if fixed point 500 is accurate.

Within check loop 610, block 612 calculates an average value of the formation property for each sub-segment length 502. To calculate an average value, all measured data is collected in the investigated REL section 302 and divided by the amount of data that was investigated in REL section 302. In block 614 an average value of a chosen formation property being investigated among each sub-segment 502 is found, similar to block 612. In block 616 the average formation property is checked to determine if it is stable as the length of REL section 302 increases. Checking the maximum and minimum, as discussed above, values occur after one iteration of computing an average as well as determining a maximum and minimum of an REL section 302. As a result, the check begins once a REL section 302 is enlarged at least once. Stability is determined by minimizing the difference between the calculated average as well as the determined maximum and minimum value obtained from the REL section 302 that is being investigated. If the average formation property is not stable then the process goes back to block 608, variables are updated, and check loop 610 is performed again. Variables in this instance are an investigation length that is increased in the re-scanning of the log samples and is re-initiated at the increased length. To update variables, a user revises the extent by which REL section 302 is enlarged, for example, smaller or larger extension of length. As an alternative, a user may also soften the stability criteria. If the average formation property is stable, then workflow 600 ends with block 618 in which each REL section 302 is determined and each REL section 302 is used to derive the applicable rock type resolution or domain description based on identified formation values. For the derivation of an REL section 302, determining the average, standard deviation, maximum and minimum values over a range of an identified rock type in formation 132 (e.g., referring to FIG. 1) to have consistent values over a range of REL sections 302 investigations may increase the length of each REL investigation section 301 in each iteration. Once convergence is found through averaging, standard deviation, the maximum and minimum denote a REL section 302.

After identifying REL section 302 from methods disclosed above, each REL section 302 may be used to define the rock type that occupies a given space in subsurface formation 132 (e.g., referring to FIG. 1). This enables a geocellular grid to be defined having a resolution that is consistent with the multiphase flow characteristics of the rock type occupying the space in subsurface formation 132. Thus, the rock-fluid interaction of the rock type controls the spatial characteristics of the space it is related to and has been observed in nature. Additionally, REL section 302 may be used to define the storage and multiphase flow characteristics within a gridless flow simulation domain so that each REL section 302 is consistent with what is observed with acquired field data. The grid or gridless model spaces may then be used to simulate production from a subsurface formation. Therefore, a grid or gridless simulation domain may be created as a function of rock type once all rock types in the input data have been identified and a REL section 302 is determined for each rock type.

The disclosure above is an improvement over current technology in that current methods omit the determination of a representative element when upscaling rock-fluid interaction across successive scales of fluid flow. As current method fluid flow modeling is characterized at finer scales and then directly assigned to attributes in coarser scale models, which leads to inaccurate history matches and predictive capability when simulating flow at the coarser scale. Contrary to current methods, this disclosure enables the quantitative assignment of rock-fluid interaction based on the description of the identified flow unit at successively coarser scales. This improvement enables an increase in accuracy in rock type descriptions at coarser scale, as well as better history matching and predictive capability in reservoir simulation and modeling. This is a direct result of classifying and implementing rock-fluid interaction across rock types that is more representative of flow at the intended coarser scale of flow simulation. The systems and methods may include any of the various features of the systems and methods disclosed herein, including one or more of the following statements.

Statement 1: A method for forming Representative Elemental Length (REL) of well data may comprise inputting log data from a borehole in a formation into an information handling system, identifying an initial length of a REL section and divide the log data into a plurality of REL investigation sections that are of substantially equal length, calculating an average value of a formation property for each of the plurality of REL investigation sections, and selecting a maximum value and a minimum value for each of the REL investigation sections. The method may further comprise checking whether the maximum value and the minimum value are stable for each of the REL investigation sections and if they the maximum value and the minimum value are stable for each of the REL investigation sections then each of the REL investigation sections become a REL section, deriving the formation property for each of the REL sections as an output, and forming a model of the formation from each of the REL sections.

Statement 2. The method of statement 1, wherein the log data is a one-dimensional well log data that is the formation property at a depth of the borehole.

Statement 3. The method of statement 1 or 2, wherein the log data is a two-dimensional image data.

Statement 4. The method of statements 1-3, wherein the log data includes one or more measurements from a downhole device.

Statement 5. The method of statement 4, wherein the downhole device is attached to a conveyance and wherein the conveyance is a wireline or a drill string.

Statement 6. The method of statements 1-4, where stable is determined by minimizing a difference between a calculated average as well as the maximum value and the minimum value obtained from the REL investigation section.

Statement 7. The method of statements 1-4 or 6, wherein the model is formed from a geocellular grid of a plurality of gridblocks, wherein the plurality of gridblocks are formed from each of the REL sections.

Statement 8. The method of statements 1-4, 6, or 7, wherein the formation property is porosity, permeability, gamma ray, resistivity, or density.

Statement 9. The method of statements 1-4 or 6-8, wherein the initial length is a resolution of a downhole tool that gathers the log data.

Statement 10. A method for forming Representative Elemental Length (REL) of well data may comprise inputting log data from a borehole in a formation into an information handling system, identifying an initial length of a REL investigation section and divide the log data into a plurality of REL investigation sections that are of substantially equal length, fixing a center for each of the plurality of REL investigation sections, selecting a sub-segment for each center in the plurality of REL investigation sections, and calculating an average value of a formation property for each sub-segment. The method may further comprise checking the formation property is stable in the sub-segment and if the formation property is stable for each of the REL investigation sections then each of the REL investigation sections become a REL section, deriving the formation property for each of the REL sections as an output, and forming a model of the formation based at least in part on the formation property of each of the REL sections.

Statement 11. The method of statement 10, wherein the log data is a one-dimensional well log data that is the formation property at a depth of the borehole.

Statement 12. The method of statements 10 or 11, wherein the log data is a two-dimensional image data.

Statement 13. The method of statements 10-12, wherein the log data includes one or more measurements from a downhole device.

Statement 14. The method of statement 13, wherein the downhole device is attached to a conveyance, wherein the conveyance is a wireline or a drill string.

Statement 15. The method of statements 10-13, wherein the model is formed from a geocellular grid of a plurality of gridblocks, wherein the plurality of gridblocks are formed from each of the REL sections.

Statement 16. The method of statements 10-13 or 15, wherein the formation property is porosity, permeability, gamma ray, resistivity, or density.

Statement 17. A system may comprise a downhole device, wherein the downhole device is configured to be disposed in a borehole and to take a plurality of measurements of a formation, and an information handling system. The information handling system may be configured to form log data from the plurality of measurements, identify an initial length of a Representative Elemental Length (REL) investigation section and divide the log data into a plurality of REL investigation sections that are of equal length, calculate an average value of a formation property for each of the plurality of REL investigation sections, select a maximum value and a minimum value of the REL investigation sections, check whether the maximum value and the minimum value are stable for each of the REL investigation sections and if they the maximum value and the minimum value are stable for each of the REL investigation sections then each of the REL investigation sections become a REL section, derive the formation property for each of the REL sections as an output, and form a model of the formation from each of the REL sections.

Statement 18. The system of statement 17, wherein the log data is a one-dimensional well log data that is the formation property at a depth of the borehole.

Statement 19. The system of statements 17 or 18, wherein the model is used to define a resolution of a geocellular grid of a plurality of gridblocks, wherein the plurality of gridblocks are formed from each of the REL sections.

Statement 20. The system of statement 19, wherein the model is used to define a domain characterization for a gridless component.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, in examples, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for forming Representative Elemental Length (REL) of well data comprising:
   inputting log data from a borehole in a formation into an information handling system;
   identifying an initial length of a REL investigation section and divide the log data into a plurality of REL investigation sections that are of substantially equal length;
   calculating an average value of a formation property for each of the plurality of REL investigation sections;
   selecting a maximum value and a minimum value for each of the plurality of REL investigation sections;
   checking whether the maximum value and the minimum value are stable for each of the plurality of REL investigation sections, and when the maximum value and the minimum value are stable for each of the plurality of REL investigation sections, each of the plurality of REL investigation sections become a REL section;
   deriving the formation property for each of the REL sections as an output; and
   forming a model of the formation from each of the REL sections.

2. The method of claim 1, wherein the log data is a one-dimensional well log data comprising the formation property at a depth of the borehole.

3. The method of claim 1, wherein the log data is a two-dimensional well log data.

4. The method of claim 1, wherein the log data includes one or more measurements from a downhole device.

5. The method of claim 4, wherein the downhole device is attached to a conveyance and wherein the conveyance is a wireline or a drill string.

6. The method of claim 1, where stable is determined by minimizing a difference between the average value as well as the maximum value and the minimum value obtained from the REL investigation section.

7. The method of claim 1, wherein the model is formed from a geocellular grid of a plurality of gridblocks, wherein the plurality of gridblocks are formed from each of the REL sections.

8. The method of claim 1, wherein the formation property is porosity, permeability, gamma ray, resistivity, or density.

9. The method of claim 1, wherein the initial length is a resolution of a downhole tool that gathers the log data.

10. A method for forming Representative Elemental Length (REL) of well data comprising:
    inputting log data from a borehole in a formation into an information handling system;
    identifying an initial length of a REL investigation section and divide the log data into a plurality of REL investigation sections that are of substantially equal length;
    fixing a center for each of the plurality of REL investigation sections;
    selecting a sub-segment for each center in the plurality of REL investigation sections;
    calculating an average value of a formation property for each sub-segment;
    checking the formation property is stable in the sub-segment, and when the formation property is stable for each of the plurality of REL investigation sections, each of the plurality of REL investigation sections become a REL section;
    deriving the formation property for each of the REL sections as an output; and
    forming a model of the formation based at least in part on the formation property of each of the REL sections.

11. The method of claim 10, wherein the log data is a one-dimensional well log data comprising the formation property at a depth of the borehole.

12. The method of claim 10, wherein the log data is a two-dimensional well log data.

13. The method of claim 10, wherein the log data includes one or more measurements from a downhole device.

14. The method of claim 13, wherein the downhole device is attached to a conveyance, wherein the conveyance is a wireline or a drill string.

15. The method of claim 10, wherein the model is formed from a geocellular grid of a plurality of gridblocks, wherein the plurality of gridblocks are formed from each of the REL sections.

16. The method of claim 10, wherein the formation property is porosity, permeability, gamma ray, resistivity, or density.

17. A system comprising:
    a downhole device, wherein the downhole device is configured to be disposed in a borehole and to take a plurality of measurements of a formation; and
    an information handling system configured to:
       form log data from the plurality of measurements;
       identify an initial length of a Representative Elemental Length (REL) investigation section and divide the log data into a plurality of REL investigation sections that are of equal length;
       calculate an average value of a formation property for each of the plurality of REL investigation sections;
       select a maximum value and a minimum value of the plurality of REL investigation sections;
       check whether the maximum value and the minimum value are stable for each of the plurality of REL investigation sections, and when the maximum value and the minimum value are stable for each of the plurality of REL investigation sections, each of the plurality of REL investigation sections become a REL section;
       derive the formation property for each of the REL sections as an output; and
       form a model of the formation from each of the REL sections.

18. The system of claim 17, wherein the log data is a one-dimensional well log data comprising the formation property at a depth of the borehole.

19. The system of claim 17, wherein the model is used to define a resolution of a geocellular grid of a plurality of gridblocks, wherein the plurality of gridblocks are formed from each of the REL sections.

20. The system of claim 19, wherein the model is used to define a domain characterization for a gridless component.

* * * * *